United States Patent
Yang et al.

(10) Patent No.: US 9,577,448 B2
(45) Date of Patent: Feb. 21, 2017

(54) INTEGRATION OF WIRELESS CHARGING UNIT IN A WIRELESS DEVICE

(71) Applicants: Songnan Yang, San Jose, CA (US); Bin Xiao, San Ramon, CA (US); Ulun Karacaoglu, San Diego, CA (US); Chung-Hao J. Chen, Portland, OR (US); James Utz, Round Rock, TX (US)

(72) Inventors: Songnan Yang, San Jose, CA (US); Bin Xiao, San Ramon, CA (US); Ulun Karacaoglu, San Diego, CA (US); Chung-Hao J. Chen, Portland, OR (US); James Utz, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 13/954,526

(22) Filed: Jul. 30, 2013

(65) Prior Publication Data

US 2015/0035474 A1 Feb. 5, 2015

(51) Int. Cl.
*H02J 7/00* (2006.01)
*H02J 7/02* (2016.01)
*G06F 1/16* (2006.01)
*G06F 1/26* (2006.01)
*H02J 17/00* (2006.01)

(52) U.S. Cl.
CPC ........... *H02J 7/0042* (2013.01); *G06F 1/1632* (2013.01); *G06F 1/26* (2013.01); *H02J 7/025* (2013.01); *H02J 17/00* (2013.01)

(58) Field of Classification Search
CPC ........ H01F 38/114; H04B 5/0037; H02J 7/025

USPC .......................................................... 320/107
See application file for complete search history.

(56) References Cited

U.S. PATENT DOCUMENTS

| | | | |
|---|---|---|---|
| 6,501,435 B1 * | 12/2002 | King et al. ..................... | 343/795 |
| 8,633,616 B2 * | 1/2014 | Soar .............................. | 307/104 |
| 8,749,195 B2 * | 6/2014 | Tabata et al. ................. | 320/108 |
| 9,166,652 B2 | 10/2015 | Yang et al. | |
| 2002/0198031 A1 * | 12/2002 | Holmes et al. ................ | 455/569 |
| 2006/0159158 A1 | 7/2006 | Moore et al. | |
| 2008/0165066 A1 * | 7/2008 | Tiscareno et al. ............ | 343/702 |
| 2009/0206675 A1 | 8/2009 | Camurati et al. | |
| 2010/0201189 A1 * | 8/2010 | Kirby et al. ................... | 307/9.1 |
| 2011/0018360 A1 * | 1/2011 | Baarman et al. ............. | 307/104 |
| 2011/0050164 A1 * | 3/2011 | Partovi et al. ................ | 320/108 |
| 2011/0156640 A1 | 6/2011 | Moshfeghi | |

(Continued)

FOREIGN PATENT DOCUMENTS

| | | |
|---|---|---|
| CN | 102804549 A | 11/2012 |
| KR | 10-1163574 B1 | 7/2012 |

(Continued)

OTHER PUBLICATIONS

Office Action received for Chinese Patent Application No. 201410369149.7, mailed on Jan. 29, 2016, 7 pages of Chinese Office Action only.

(Continued)

*Primary Examiner* — Suchin Parihar
(74) *Attorney, Agent, or Firm* — Forefront IP Lawgroup of Christie and Rivera, PLLC (57) ABSTRACT

Described herein are techniques related to one or more systems, apparatuses, methods, etc. for implementing a wireless charging and a wireless connectivity in a device.

19 Claims, 8 Drawing Sheets

(56) References Cited

U.S. PATENT DOCUMENTS

| | | | |
|---|---|---|---|
| 2011/0164471 A1* | 7/2011 | Baarman et al. | 368/10 |
| 2012/0081213 A1 | 4/2012 | Rosenblatt | |
| 2012/0099566 A1 | 4/2012 | Laine et al. | |
| 2012/0171951 A1 | 7/2012 | 't Hooft | |
| 2012/0180086 A1 | 7/2012 | Yang | |
| 2012/0282858 A1 | 11/2012 | Gill et al. | |
| 2013/0002039 A1* | 1/2013 | Kusamitsu | 307/104 |
| 2013/0015811 A1* | 1/2013 | Tang et al. | 320/108 |
| 2013/0043735 A1 | 2/2013 | Low et al. | |
| 2013/0093388 A1* | 4/2013 | Partovi | 320/108 |
| 2013/0260677 A1* | 10/2013 | Partovi | 455/41.1 |
| 2014/0232331 A1* | 8/2014 | Stamenic et al. | 320/108 |
| 2014/0253024 A1* | 9/2014 | Rautiainen et al. | 320/108 |
| 2014/0327394 A1* | 11/2014 | Asselin et al. | 320/108 |
| 2015/0130286 A1* | 5/2015 | Kozasu et al. | 307/104 |
| 2015/0194837 A1* | 7/2015 | Tom et al. | 320/108 |

FOREIGN PATENT DOCUMENTS

| | | |
|---|---|---|
| KR | 10-2012-0129821 A | 11/2012 |
| KR | 10-2013-0018506 A | 2/2013 |
| WO | 2013/056879 A1 | 4/2013 |
| WO | 2014/039133 A1 | 3/2014 |
| WO | 2015016898 A1 | 2/2015 |

OTHER PUBLICATIONS

International Preliminary Report on Patentability and Written Opinion received for PCT Patent Application No. PCT/US2013/046475, mailed on Mar. 19, 2015, 6 pages.

Interntional Search Report and Written Opinion received for PCT Patent Application No. PCT/US2013/046475, mailed on Sep. 26, 2013, 9 pages.

International Preliminary Report on Patentability and Written Opinion received for PCT Patent Application No. PCT/US2013/052978, mailed on Feb. 11, 2016, 11 pages.

International Search Report and Written Opinion received for PCT Patent Application No. PCT/US2013/052978, mailed on May 2, 2014, 15 pages.

Office Action received for Chinese Patent Application No. 201410369149.7, mailed on Sep. 29, 2016, 13 pages of Chinese Office Action including 7 pages Of English Translation.

* cited by examiner

INTEGRATION OF WIRELESS CHARGING UNIT IN A WIRELESS DEVICE

BACKGROUND

A docking station arrangement may provide a way of connecting peripherals such as a monitor, a keyboard, etc. to a device, such as a laptop computer. A wide range of different devices such as mobile phones, tablets, etc. may be docked to provide a convenient connection to these peripherals.

The docking station arrangement may facilitate a wireless charging and a wireless connectivity to the device. For example, the wireless charging may be implemented through a power transfer from the docking station to the device. The wireless power transfer may require, for example, a set of electrodes to be installed or mounted in the device and the docking station. On the other hand, the wireless connectivity may require additional antenna couplers to be installed in the device and the docking station.

With smaller and thinner devices, the installation or mounting of the set of electrodes and the antenna couplers are physically limited by availability of space within the devices. For example, to integrate the set of electrodes into a thinner device, a large planar area on the bottom of the thinner device is required to accommodate the set of electrodes (i.e., passive and active electrodes). In this example, current implementations may not allow this design since such an implementation may add undesirable thickness size to its overall structure.

Accordingly, a solution allowing efficient integration of the set of electrodes and the antenna coupler into the device is desired.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a wireless charging and a wireless connectivity in a device. For example, the device utilizes a wireless charging unit and an antenna coupler to implement the wireless charging and the wireless connectivity, respectively. In this example, the antenna coupler may be integrated into the wireless charging unit.

In an implementation, the device (e.g., wireless device) includes the wireless charging unit in its base. The wireless charging unit, for example, is utilized to transmit or receive a charging power from another device such as a docking station. In this example, the wireless charging unit is paired with docking electrodes that are installed in a docking surface of the docking station.

The close proximity (i.e., during pairing) between the wireless charging unit and the docking electrodes may facilitate transfer of power through the capacitance formed between the electrodes. For example, the device through its wireless charging unit may receive the charging power that is generated by the docking electrodes. In another example, the wireless charging unit may transmit the capacitive wireless charging power to another device.

In an implementation, the wireless charging unit includes a conductive chassis (e.g., metallic chassis) that is configured to act as a passive device electrode. In this implementation, the conductive chassis includes a cutout that forms an opening along a planar surface of the conductive chassis. The cutout is then covered with a dielectric insert, which is used to insulate the wireless charging unit and particularly, the passive device electrode from an active device electrode.

The dielectric insert includes, for example, a plastic material to provide mechanical strength to the cutout. In an implementation, a conductive plate is integrated into the dielectric insert. For example, the conductive plate is configured to act as the active device electrode that is mounted or laminated concentrically to the dielectric insert. In this example, the combination of the passive device electrode and the active device electrode facilitates the transmission or reception of the capacitive wireless charging power.

As an example of present implementations herein, the antenna coupler is integrated to the active device electrode of the wireless charging unit. For example, the integration between the dielectric insert, the active device electrode, and the antenna coupler provides a combined thickness that adapts the thickness of the conductive chassis. In this example, the integration of the active and the passive device electrodes and the antenna coupler to the device is not limited by availability of space to the already thin device.

Figure 1:
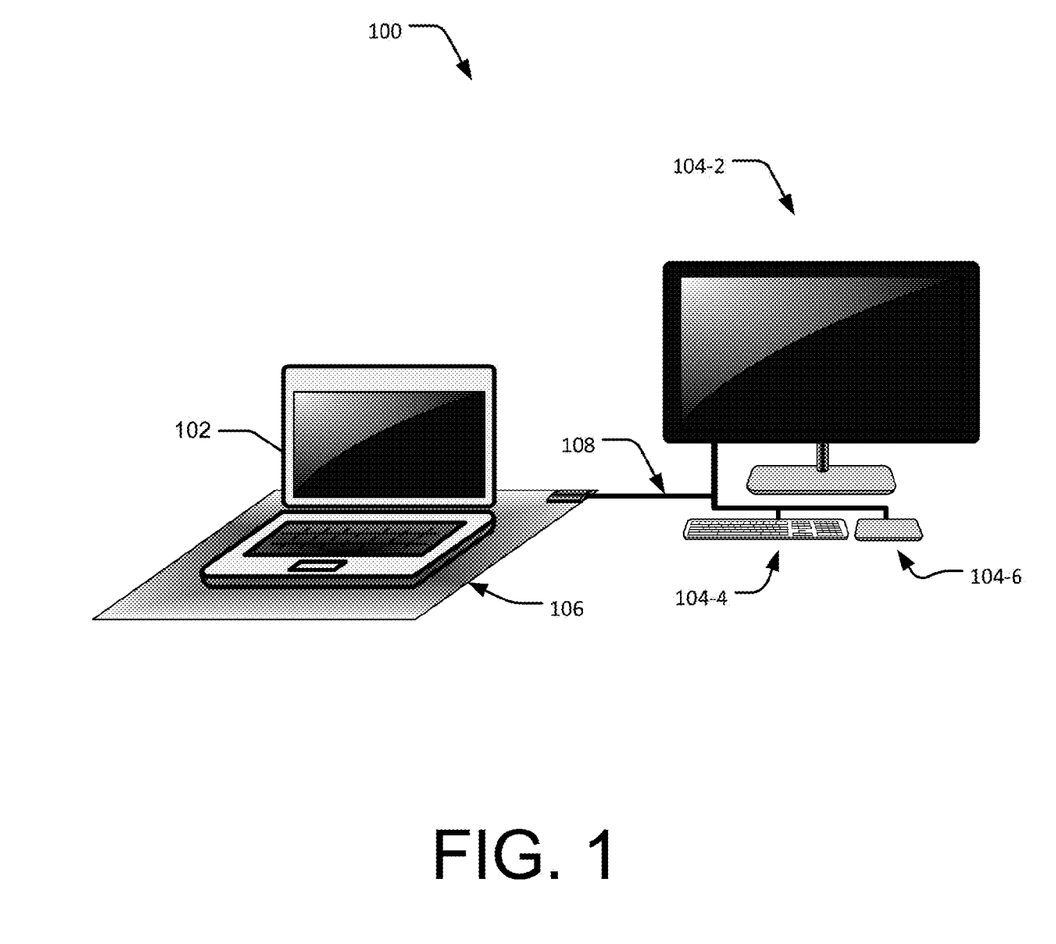
FIG. 1 shows an example docking station arrangement.

FIG. 1 illustrates an example docking station arrangement 100 that shows a device (e.g., wireless device) connecting with peripheral devices through a docking station. FIG. 1 includes, for example, a wireless device 102, peripheral devices 104, a docking station 106, and a wired link 108. The peripheral devices 104 include, for example, a monitor 104-2, a keyboard 104-4, and a mouse 104-6.

The wireless device 102 utilizes the docking station 106 to establish wireless communications with the peripheral devices 104. For example, the wireless device 102 is using the monitor 104-2 as an extended wireless display (i.e., Wi-Di). In this example, the wireless device 102 is positioned in close proximity (e.g., few millimeters) with the docking station 106 surface in order to utilize the monitor 104-2. The docking station 106 herein is connected to the monitor 104-2 through the wired link 108. On the other hand, the wireless pairing between the wireless device 102 and the docking station 106 is implemented through their respective antenna couplers (not shown).

In another scenario, the wireless device 102 utilizes the docking station 106 for wireless charging. For example, the wireless device 102 includes a wireless charging unit (not shown) that is configured to receive a capacitive wireless power transfer from the docking station 106. In this example, the capacitive wireless transfer is implemented through electrical influence between the wireless charging unit and docking electrodes (not shown) of the docking station 106.

In an implementation, the wireless charging unit includes a set of device electrodes (i.e., active and passive electrodes) that are positioned in a bottom surface or base of the wireless device 102. This set of electrodes are paired, for example, with the docking electrodes that are positioned on top planar surface (i.e., docking surface) of the docking station 106. The top planar surface contains, for example, an area where the base of the wireless device 102 is typically landing during docking operations.

U.S. Pat. No. 8,242,638 B2 is utilized herein as a reference to the details of the capacitive wireless power transfer (i.e., transporting of energy) between the paired wireless charging unit and the docking electrodes. In other words, the electrical influence between the set of device electrodes of the wireless device 102 and the docking electrodes of the docking station 106 are further discussed in details by the above reference patent application.

In an implementation, the wireless device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

Similarly, the peripheral devices 104 may include, but are not limited to, Input, Output, or Storage peripheral devices 104. The input peripheral device 104 may provide input to the wireless device 102 from a user such as through the keyboard 104-4, mouse 104-6, etc. The output peripheral device 104 may provide output to the user such as, for example, the monitor 104-2 or a printer (not shown). A storage peripheral device 104 may store data (not shown) in between computing sessions such as through a hard drive (not shown) or flash drive (not shown).

Figure 2:
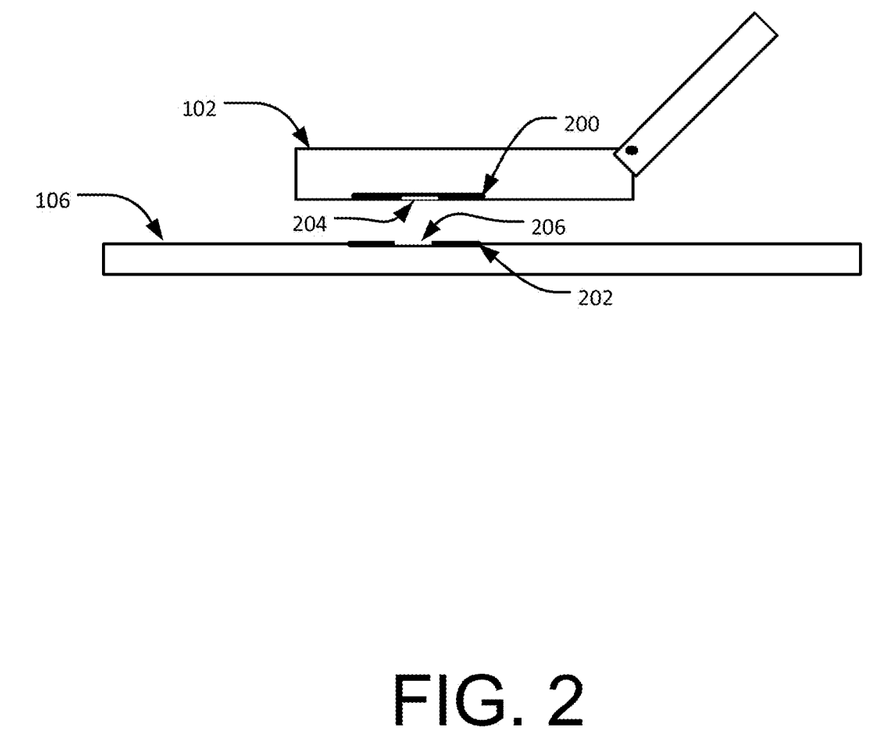
FIG. 2 illustrates an example scenario that implements a wireless charging and a wireless connectivity between a device and a docking station.

FIG. 2 illustrates an example scenario that implements wireless charging and wireless connectivity between the wireless device 102 and the docking station 106.

As shown, FIG. 2 illustrates the wireless device 102 with a wireless charging unit 200, and the docking station 106 with a mounted docking electrodes 202. Additionally, an antenna coupler 204 is integrated to the wireless charging unit 200 while another antenna coupler 206 is integrated to the docking electrodes 202.

In an implementation, the wireless device 102 docks to the planar surface of the docking station 106 in order to transmit or receive wireless data transfer. For example, the close proximity between the antenna couplers 204 and 206 establishes a wireless communication between the wireless device 102 and the docking station 106. In this example, the established wireless communication is utilized for the transmission and reception of the wireless data transfer.

During wireless data transfer operation, the wireless device 102 may further receive the charging power through the electrical influence between the wireless charging unit 200 and the docking electrodes 202. For example, the docking electrodes 202 are energized to generate electric fields. In this example, the generated electric fields may facilitate transfer of the charging power to the wireless charging unit 200 that are positioned in close proximity with the docking electrodes 202. In other words, when the wireless device 102 is docked in the docking station 106 to perform wireless connectivity (e.g., wireless data transfer), the wireless device 102 may receive the charging power as well.

In an implementation, the integration of the antenna coupler 204 to the wireless charging unit 200 may introduce additional unwanted amount of capacitance that may affect the efficiency of the wireless charging and the wireless connectivity. To this end, additional decoupling capacitances (not shown) are integrated to the circuitry of the wireless charging unit 200 and the antenna coupler 204. The decoupling capacitances, for example, minimizes the effects of the unwanted amount of introduced capacitance.

Figure 3:
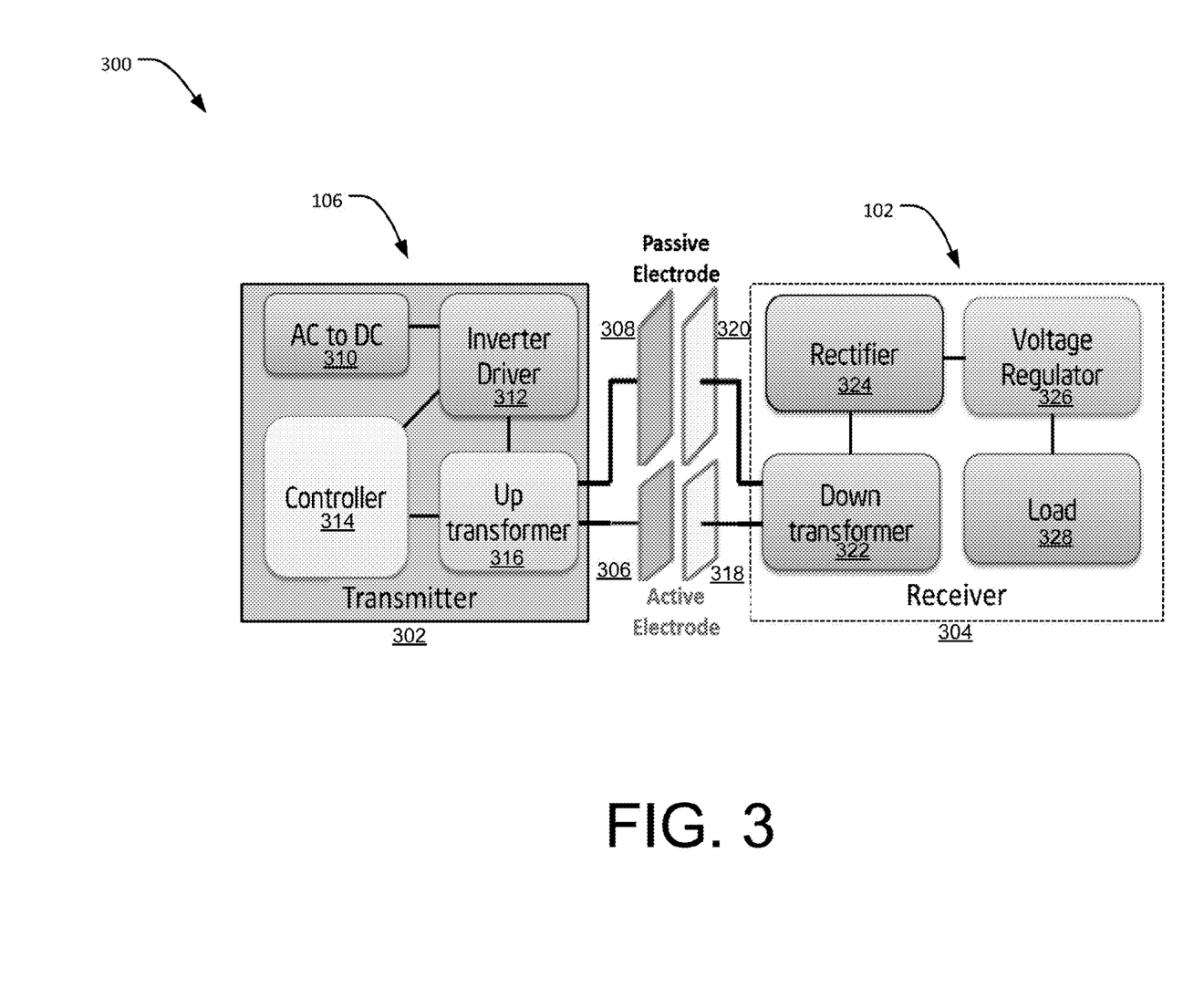
FIG. 3 illustrates an example system diagram that implements a wireless charging in a device.

FIG. 3 illustrates an example system 300 that implements the wireless charging of the wireless device 102.

The example system 300 shows the wireless charging system block diagram of the docking station 106 and the wireless device 102. For example, the docking station 106 is configured to contain a transmitter 302 while the wireless device 102 is configured to contain the receiver 304. The transmitter 302 transmits the charging power while the receiver 304 receives the charging power through electrical influence between the transmitter 302 and the receiver 304. In another example, this set-up is interchanged. In other words, the docking station 106 may be configured as the receiver of the charging power while the wireless device 102 may be configured as the transmitter of the charging power.

As an example of present implementations herein, the transmitter 302 includes an active docking electrode 306, a passive docking electrode 308, an AC to DC unit 310, inverter driver 312, a controller 314 and an up-transformer 316. In an implementation, the active docking electrode 306 and the passive docking electrode 308 may be treated as the docking electrodes 202. In this implementation, the rest of the components of the transmitter 302 may be treated as a docking electrode module or circuitry. For example, the docking electrode module or circuitry controls or facilitates the generation of the charging power in the docking electrodes 202.

With continuing reference to FIG. 3, the receiver 304 includes an active device electrode 318, a passive device electrode 320, a down-transformer 322, a rectifier 324, a voltage regulator 326 and a load 328. In an implementation, the receiver 304 may be treated as the wireless charging unit 200 of the wireless device 102 that is configured to be in "receive" mode.

During the wireless charging (i.e., power transfer operation), the active docking electrode 306 and the active device electrode 318 are in close proximity with each other. Due to the electrical influence between them, a generated high electric field area surrounds the active docking electrode 306 and the active device electrode 318. For example, the active docking electrode 306 is supplied with higher voltages or potential by the up-transformer 316. In this example, the active docking electrode 306 facilitates the high electric field area that surrounds the active docking electrode 306 and the active device electrode 318.

As opposed to the passive docking electrode 308, the passive docking electrode 308 is subjected to or supplied with lower voltages by the up-transformer 316. To this end, the passive docking electrode 308 generates weaker electric fields in its environment (i.e., low electric field area).

As an example of present implementations herein, the electrical influence between the active docking electrode 306 and the active device electrode 318 facilitates the capacitive wireless charging between the docking station 106 and the wireless device 102.

For example, at the transmitter 302 side, the AC to DC unit 310 provides a direct current (DC) output. The inverter driver 312 will then convert and utilize the DC output in supplying an alternating current (AC) input to the up-transformer 316. Typically, the up-transformer 316 is a high voltage high frequency (HVHF) power generator and its operation is controlled by the controller 314. For example, the up-transformer 316 supplies higher amount of voltages to the active docking electrode 306 as compared to amount of voltages that are supplied to the passive docking electrode 308. In this example, the controller 314 regulates the amount of AC input that is supplied by the inverter driver 312 and also the amount of voltages that are generated by the up-transformer 316.

The up-transformer 316 supplies the higher potential to the active docking electrode 306 while the passive docking electrode 308 is subjected to lower potential (i.e., treated as a reservoir or ground). In this set-up, the active docking electrode 306 generates the high electric fields, which in turn, will facilitate the transfer of the energy power from the active docking electrode 306 of the docking station 106 to the active device electrode 318 of the wireless device 102.

At the receiver 304 side, the down-transformer 322 receives induced AC potential from the active device electrode 318 and downgrades or reduces the amount of this AC potential. For example, the reduction of the AC potential is implemented to conform with amount of biasing voltages to charge the load 328. In this example, the rectifier 324 will then convert the decreased AC potential into DC output. The DC output is then supplied to the voltage regulator 326, which controls the amount of voltage that is supplied to the load 328. For example, the voltage regulator 326 supplies the charging DC current to the load 328.

Figure 4A:
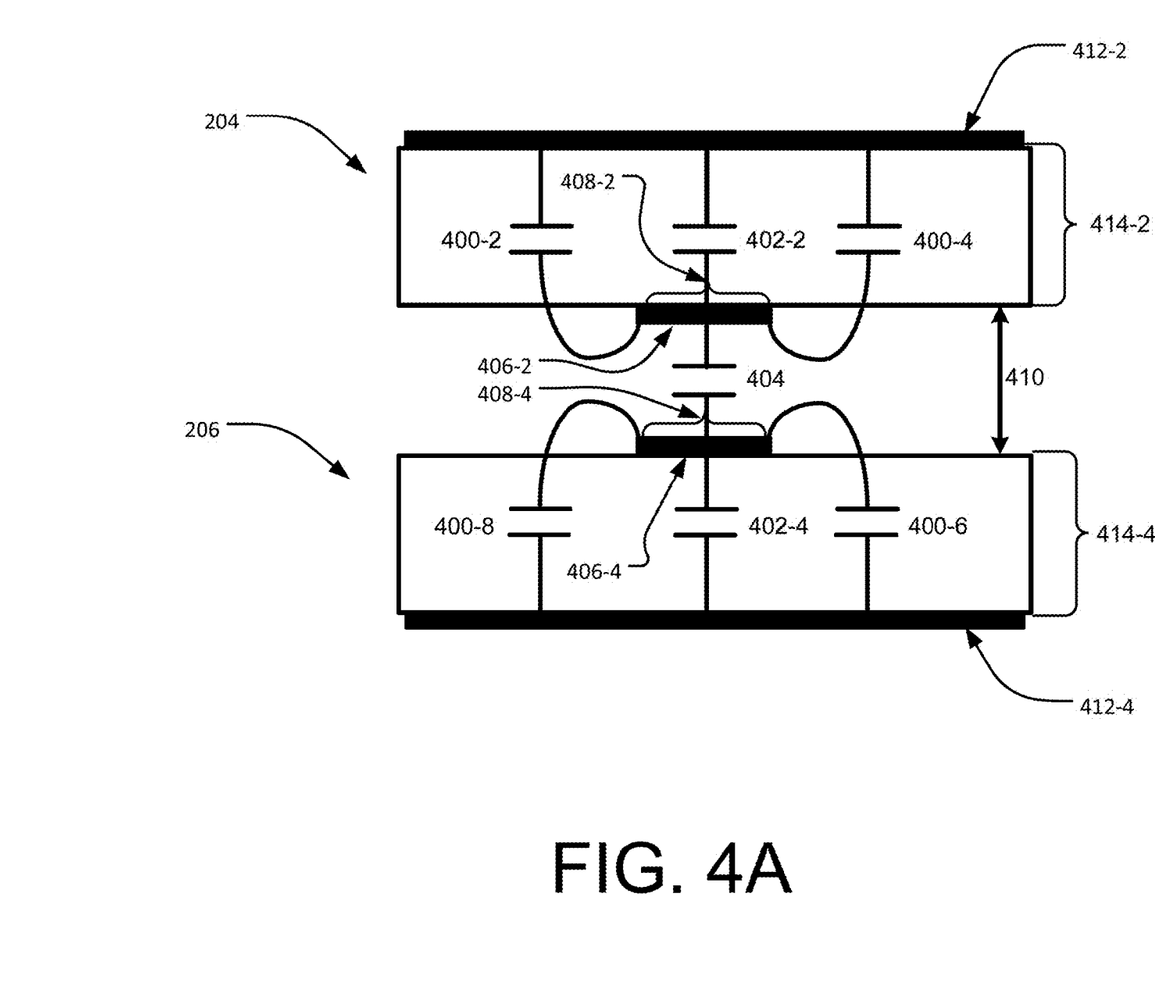
FIG. 4A illustrates an example structure and electrical characteristics of antenna couplers during a wireless connectivity operation.

FIG. 4A illustrates example structure and electrical characteristics of the antenna couplers 204 and 206. For example, the antenna couplers 204 and 206 may be integrated to the active device electrode 318 and the active docking electrode 306, respectively.

As shown, the antenna coupler 204 is in face-to-face position with the antenna coupler 206. In other words, the antenna coupler 204 is directly positioned within a near field radiation of the antenna coupler 206. Furthermore, FIG. 4A illustrates fringing capacitances 400, parallel plate capacitances 402, a coupling capacitance 404, microstrip conductors 406, microstrip conductor widths 408, a coupling distance 410, ground planes 412, and substrate thickness 414.

As an example of present implementations herein, the microstrip conductors 406 are low loss transmission lines that are commonly used, for example, in microwave circuits. The antenna coupler 204, for example, includes a dielectric material—the thickness of which is defined by the substrate thickness 414-2. The dielectric material is located in between the microstrip conductor 406-2 and the ground plane 412-2.

When the size of the substrate thickness 414-2 is thinner as compared to a wavelength and that the antenna coupler 204 is terminated by a matched load (not shown), then a smaller far field radiation may result. For example, the size of the wavelength is defined by frequency of a signal current in the microstrip conductor 406. In this example, the signal current that flows in the microstrip conductor 406-2 and the signal current that returns through the ground plane 412-2 (i.e., return path) appear to be very close to each other. As a result, the cancellation of the currents may generate the smaller far field radiation due to an exponential decay over distance of the fringing fields.

However, with regard to its near field radiation, the same structure may support a strong near field coupling. For example, when the microstrip conductor 406-2 and the microstrip conductor 406-4 are brought closer to each other during the docking operation, the coupling capacitance 404 will generate a higher value. In this example, the coupling capacitance 404 increases when the coupling distance 410 decreases. The coupling capacitance 404 further increases when a higher overlapping area between the microstrip conductors 406 is obtained. For example, a higher overlapping area between the microstrip conductor widths 408 increases the coupling capacitance 404.

With continuing reference to FIG. 4A, the parallel plate capacitances 402 may include equivalent capacitances for parasitic capacitances in the microstrip lines. The parallel plate capacitances 402 co-exist with the fringing capacitances 400 when signal currents are flowing through the microstrip lines. For example, the fringing capacitances 400-2 and 400-4 represent electrical characteristics of the antenna coupler 204 due to energizing signal currents.

As mentioned above, the integration of the antenna coupler 204 to the wireless charging unit 200 may introduce additional unwanted amount of capacitance that may affect the efficiency of the wireless charging and the wireless connectivity. To this end, additional decoupling capacitances (not shown) are integrated to the circuitry of the wireless charging unit 200 and the antenna coupler 204. The decoupling capacitances, for example, minimizes the effects of the unwanted amount of introduced capacitance.

Figure 4B:
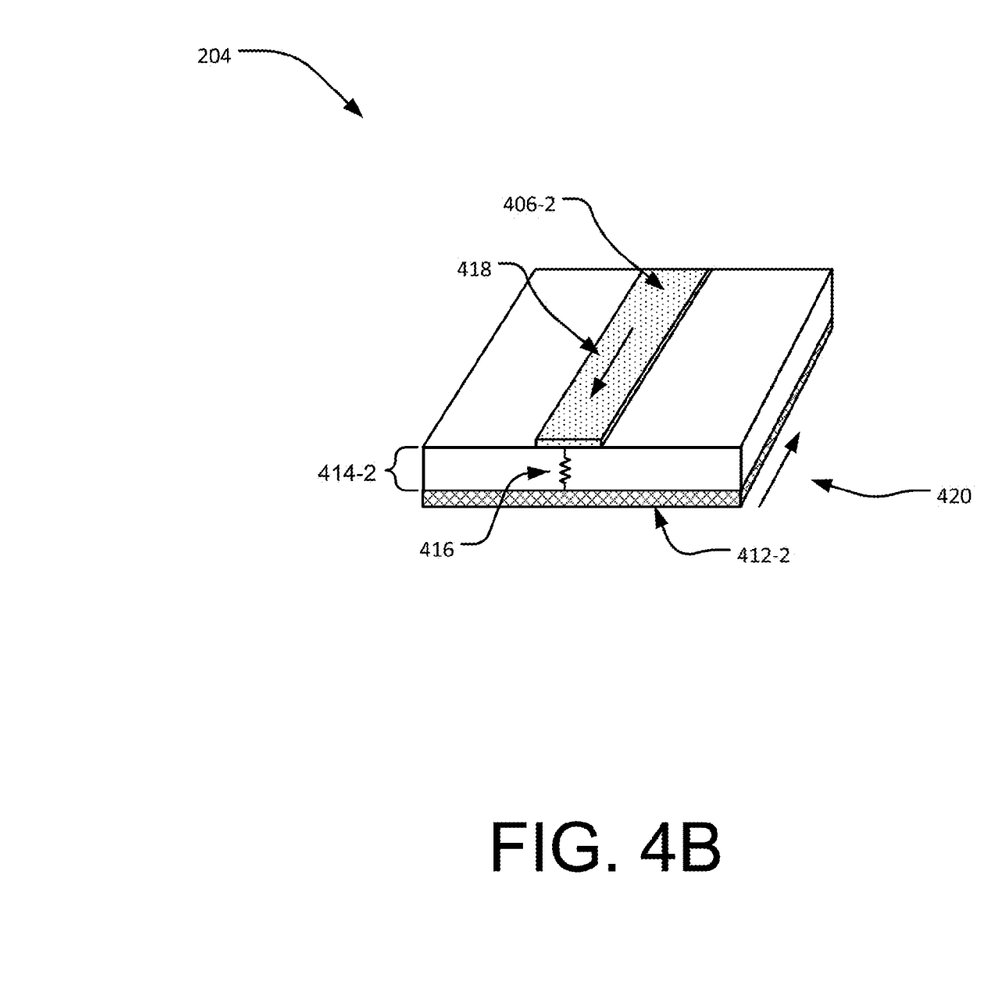
FIG. 4B illustrates an example antenna coupler with a matching load termination.

FIG. 4B illustrates an example antenna coupler 204 with a matching load termination. As shown, FIG. 4B shows the antenna coupler 204 with a matching load termination 416, a signal current direction 418, and a return current direction 420.

In an implementation, the matching load termination 416 is designed maximize power transfer or to minimize reflections in the microstrip conductor 406-2. For example, when the matching load termination 416 is equal to characteristic impedance of the microstrip conductor 406-2, a minimum leakage is obtained. With this minimum leakage, the antenna coupler 204 will generate low radiation. In other words, the fringing electric fields of the antenna coupler 204 will provide a uniform and strong capacitive coupling in near field radiation.

FIG. 4B further illustrates the direction of the signal current (i.e., signal current direction 418) to be opposite in direction with the return current (i.e., return current direction 420). With the matching load termination 416, the signal and return currents appear to be very close to each other. In other words, the antenna coupler 204 will generate a low far field radiation while the emitted near field radiation will be stronger.

Figure 5:
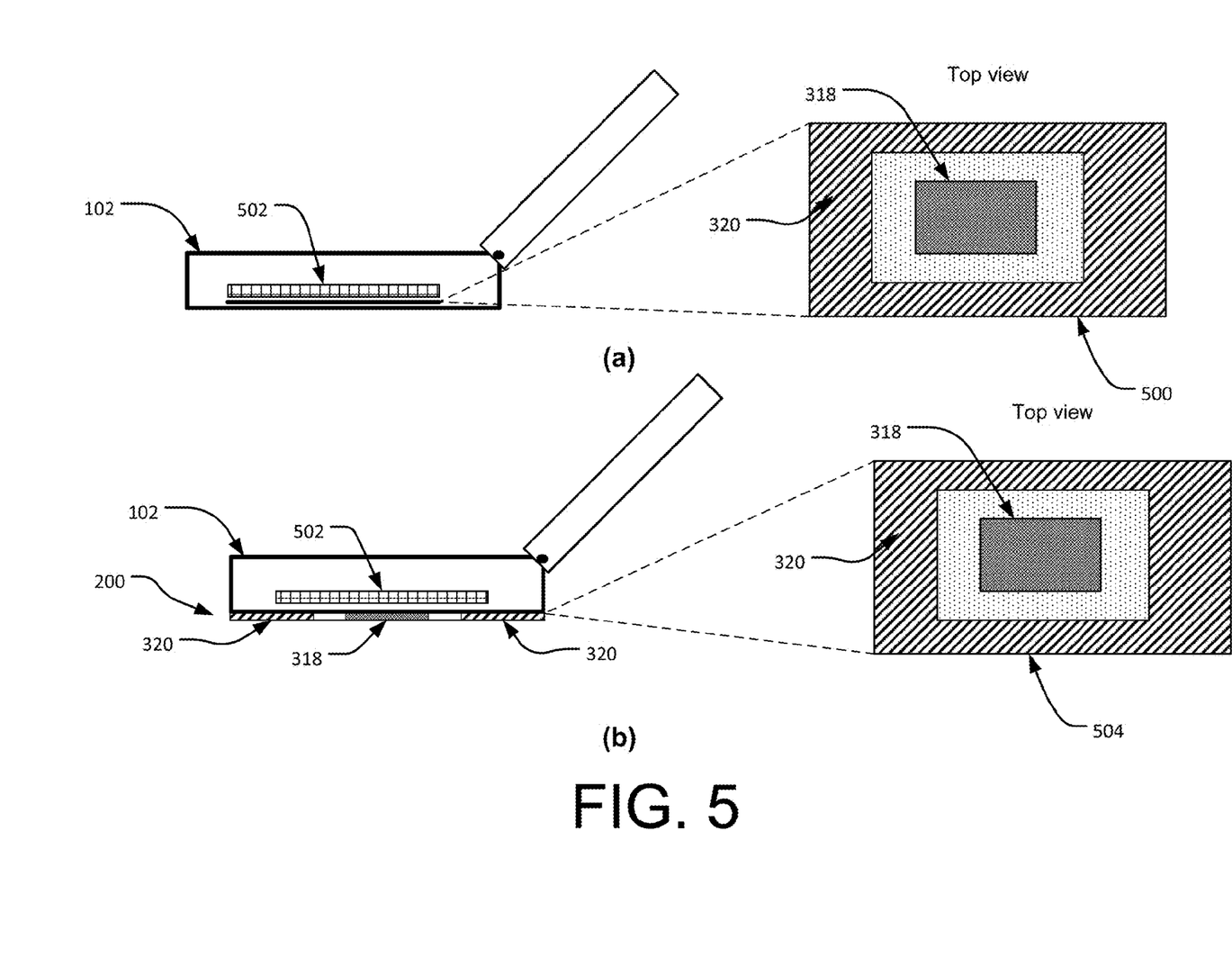
FIGS. 5*a* and 5*b* illustrate conventional mounting of a wireless charging unit in a device.

FIGS. 5a and 5b illustrate conventional mounting of the wireless charging unit 200 in the wireless device 102.

FIG. 5a shows a printed circuit board (PCB) 500 which is a building material for the wireless charging unit 200 in FIG. 2. The PCB 500 includes the active device electrode 318 and the passive device electrode 320. For example, the passive device electrode 320 is etched along outer perimeter of the PCB 500 while the active device electrode 318 is also etched along the PCB's center portion. In this example, the PCB 500 is mounted between a motherboard 502 and bottom cover of the wireless device 102. Furthermore, the passive device electrode 320 of the PCB 500 is grounded through the motherboard 502 of the wireless device 102.

Although the wireless charging unit in FIG. 5a may facilitate capacitive wireless charging, its integration into the wireless device 102 is substantially limited by availability of space within the wireless device 102. Furthermore, the grounding through the motherboard 502 will generate more parasitic capacitance that may affect the wireless charging operation. For example, the grounding through the mother board 302 may not be able to pass regulatory test due to the electrostatic discharge (ESD).

FIG. 5b illustrates another example of conventional mounting of the wireless charging unit 200 into the wireless device 102.

FIG. 5b shows a plastic chassis 504 which is the building material for the wireless charging unit 200. The plastic chassis 504 similarly contains the active device electrode 318 and the passive device electrode 320. For example, the passive device electrode 320 is laminated along outer perimeter of the plastic chassis 504 while the active device electrode 318 is also laminated along the plastic chassis' center portion. In this example, the plastic chassis 504 is positioned at the bottom of the wireless device 102. Similarly, this configuration may facilitate capacitive wireless coupling; however, the plastic chassis 304 limits the mechanical strength of the wireless device 102.

Figure 6:
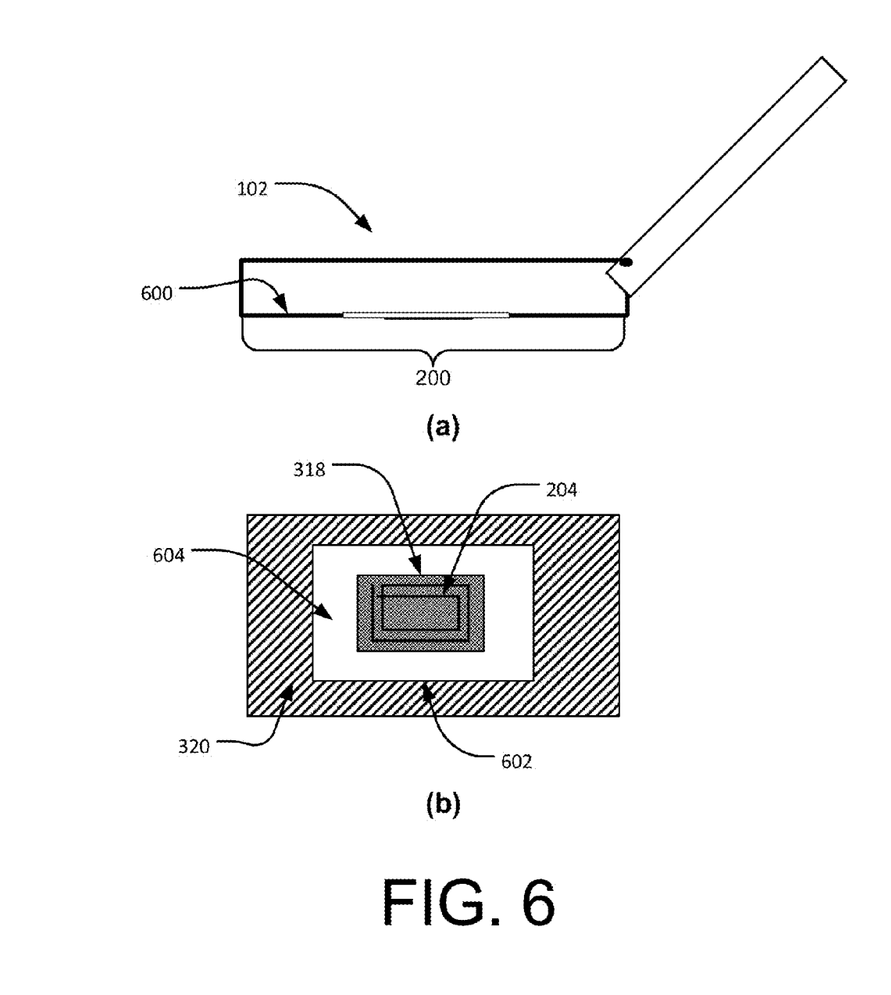
FIG. 6*a* illustrates an example integration of a wireless charging unit in a device in accordance with technology as described herein.
FIG. 6*b* illustrates an example top view of a wireless charging unit in accordance with technology as described herein.

FIG. 6a shows an example integration of the wireless charging unit 200 into the wireless device 102 in accordance with technology as described herein. On the other hand, FIG. 6b shows a top view of the wireless charging unit 200 and the integrated antenna coupler 204.

With continuing reference to FIG. 6a, the wireless charging unit 200 includes a conductive chassis such as a metallic chassis 600 that is positioned at the bottom of the wireless device 102. For example, the metallic chassis 600 may cover the bottom and surrounding keyboard areas of the wireless device 102. In this example, the metallic chassis 600 is configured as the passive device electrode 320 that is grounded directly to a system ground of the wireless device 102. In other words, the grounding of the metallic chassis 600 need not pass through the motherboard circuitry, which causes interference in the wireless device 102. Instead, the grounding of the metallic chassis 600 is directed to the system ground, which provides a path for the ESD noise to propagate to earth ground.

With continuing reference to FIG. 6b, FIG. 6b shows the top view of the metallic chassis 600 with a cutout 602, a dielectric insert 604, the active device electrode 318, and the integrated antenna coupler 204.

In an implementation, the cutout 602 is a portion of the metallic chassis 600 that is removed from its planar surface. For example, the cutout 602 is a square shape, a round shape, or an oblong shape that is curved out along middle portion of the metallic chassis 600. In this example, the dielectric insert 604 is inserted to cover the area that is defined by the cutout 602.

As an example of present implementations herein, the dielectric insert 604 is made up of composite materials (e.g., plastic materials) to provide mechanical strength to the removed portion of the metallic chassis 600. Furthermore, the dielectric insert 604 provides insulation to the metallic chassis 600 that is configured to act as the passive device electrode 320.

In an implementation, the dielectric insert 604 includes the integrated active device electrode 318. For example, the active device electrode 318 is a conductive plate that is laminated along middle portion of the dielectric insert 604. In this example, the antenna coupler 204 is further integrated to the active device electrode 318. A combined thickness (i.e., total thickness) of the dielectric inset 604, the active device electrode 318 and the antenna coupler 204 adapts the thickness of the metallic chassis 600. In other words, the introduction of the wireless charging unit 200 to the wireless device 102 is not limited by the availability of space within the wireless device 102.

Figure 7:
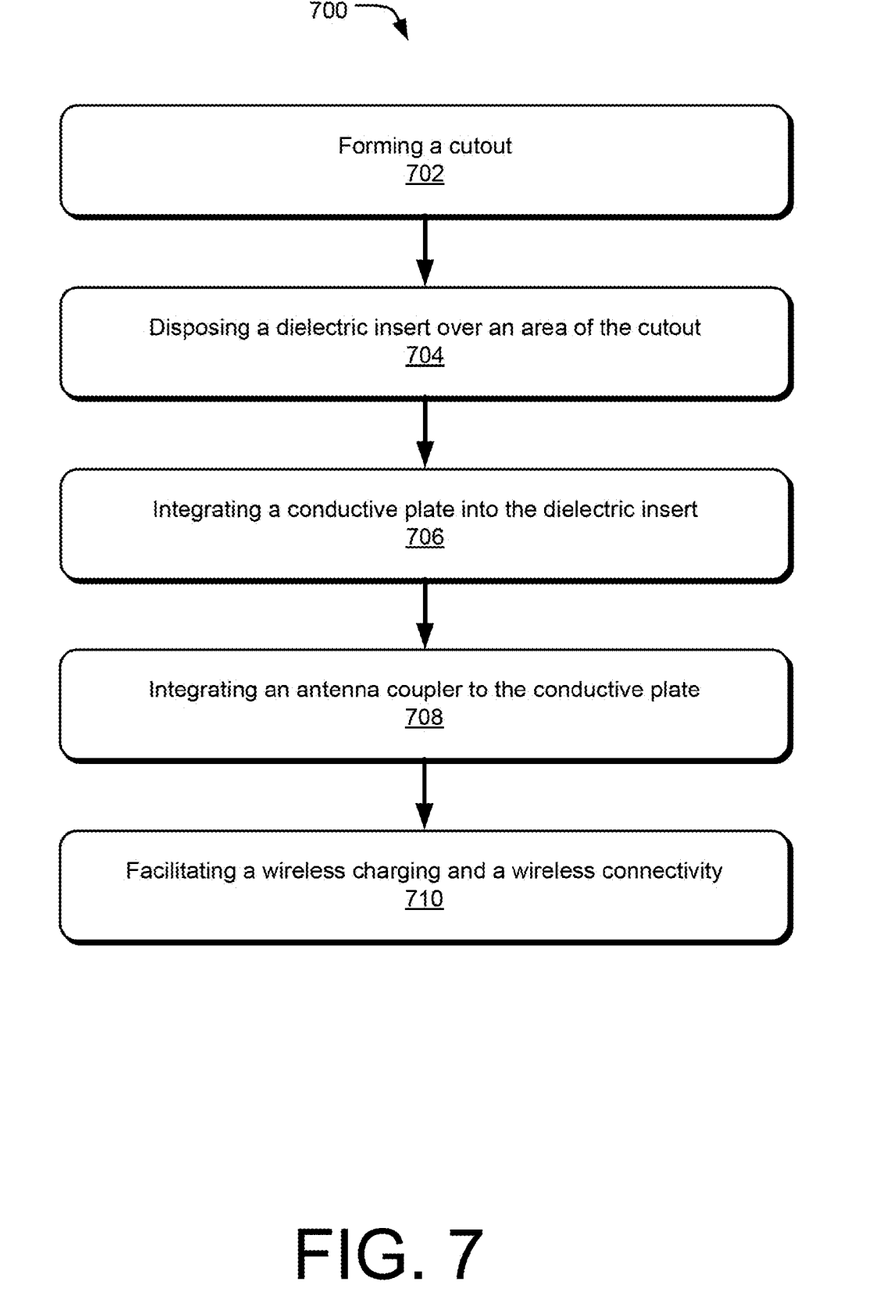
FIG. 7 an example process chart showing an example method for implementing a wireless charging and a wireless connectivity in a device.

FIG. 7 shows an example process chart 700 illustrating an example method for implementing a wireless charging and a wireless connectivity in a wireless device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, forming a cutout along a planar surface of a conductive chassis of the device and configuring the conductive chassis as a passive device electrode is performed. In an implementation, a wireless charging unit (e.g., wireless charging unit 200) includes a conductive chassis (e.g., metallic chassis 600) that is configured to act as a passive device electrode (e.g., passive device electrode 320). In this implementation, the conductive chassis includes a cutout (e.g., cutout 602) along the planar surface of a bottom portion of the device (e.g., wireless device 102).

At block 704, disposing a dielectric insert over an area of the cutout is performed. For example, the wireless charging unit 200 includes a dielectric insert (e.g., dielectric inset 604) that is positioned to cover an area of the cutout 602. In an implementation, the dielectric insert 604 is made of non-conductive plastic materials provide insulation to the wireless charging unit 200. In this implementation, the dielectric insert 604 is shaped to cover the area of the cutout 602. Furthermore, the dielectric insert 604 is mounted to provide mechanical strength in the metallic chassis 600.

At block 706, integrating a conductive plate into the dielectric insert is performed. For example, the wireless charging unit 200 includes the conductive plate that is integrated to the dielectric insert 604. In this example, the conductive plate is configured to act as an active device electrode (e.g., active device electrode 318) that is laminated or integrated to the dielectric insert 604. The active device electrode 318 may be subjected to high electric fields during capacitive wireless charging process. The electric fields may be generated, for example, by the docking electrodes of the docking station 106.

At block 708, integrating an antenna coupler to the conductive plate is performed. For example, the antenna coupler 204 is integrated to the active device electrode 318. In this example, the antenna coupler 204 and the active device electrode are actually operating independently from one another. For example, the antenna coupler 204 is operating on a high frequency signal with a minimal operating voltage when processing data signal during a wireless connectivity. On the other hand, the wireless charging unit 200, which includes the active device electrode 318, is operating on a low frequency signal and a relatively high operating voltage as compared to the operating voltage of the antenna coupler 204.

In an implementation, a high-pass filter element (e.g., set of decoupling capacitors) is utilized to separate the data signal during the wireless connectivity from the low-frequency charging power during wireless charging operation.

At block 710, facilitating a wireless charging using the active device electrode and the passive device electrode and providing a wireless connectivity through the antenna coupler is performed.

The following examples pertain to further embodiments:

Example 1 is a device comprising: a conductive chassis positioned at a bottom surface of the device, the conductive chassis includes a cutout that forms an opening in the bottom surface, wherein the conductive chassis is configured as a passive device electrode; a dielectric insert that is positioned to cover an area of the cutout; a conductive plate that is integrated to the dielectric insert, the conductive plate is configured as an active device electrode, wherein the active device electrode and the passive device electrode facilitate a wireless charging of the device.

In Example 2, the device as recited in Example 1, wherein the conductive chassis is a metallic chassis.

In Example 3, the device as recited in Example 1, wherein the conductive chassis is connected to a system ground.

In Example 4, the device as recited in Examples 1, 2, or 3, wherein the dielectric insert includes a size that is greater than the size of the conductive plate, wherein the conductive plate is concentric with the dielectric insert.

In Example 5, the device as recited in Examples 1, 2, or 3, wherein the dielectric insert is made of a plastic material.

In Example 6, the device as recited in Examples 1, 2, or 3, wherein a combined thickness of the dielectric insert and the integrated conductive plate adapts the thickness of the conductive chassis.

In Example 7, the device as recited in Examples 1, 2, or 3, wherein the device is selected from a group that includes a tablet, a mobile phone, and a laptop.

In Example 8, the device as recited in Examples 1, 2, or 3 further comprising an antenna coupler that is integrated to the conductive plate.

In Example 9, a wireless charging unit comprising: a conductive chassis configured as a passive device electrode, the conductive chassis includes a cutout that forms an opening along a planar surface of the conductive chassis; a dielectric insert that is positioned to cover an area of the cutout; a conductive plate that is integrated to the dielectric insert, the conductive plate is configured as an active device electrode, wherein the active device electrode and the passive device electrode facilitate transmission or reception of a wireless charging power.

In Example 10, the wireless charging unit as recited in Example 9, wherein the conductive chassis is connected to a system ground.

In Example 11, the wireless charging unit as recited in Example 9, wherein the conductive chassis is a metallic chassis.

In Example 12, the wireless charging unit as recited in Examples 9, 10, or 11, wherein the dielectric insert includes a size that is greater than the size of the conductive plate, wherein the conductive plate is concentric with the dielectric insert.

In Example 13, the wireless charging unit as recited in Examples 9, 10, or 11, wherein the dielectric insert is made of a plastic material.

In Example 14, the wireless charging unit as recited in Examples 9, 10, or 11, wherein a combined thickness of the dielectric insert and the integrated conductive plate adapts the thickness of the conductive chassis.

In Example 15, the wireless charging unit as recited in Examples 9, 10, or 11, wherein the wireless charging unit is connected to a tablet, a mobile phone, or a laptop.

In Example 16, the wireless charging unit as recited in Examples 9, 10, or 11, wherein the conductive plate includes an integrated antenna coupler that is utilized to facilitate a wireless connectivity.

In Example 17, a method of implementing a wireless charging and a wireless connectivity in a device, the method comprising: forming a cutout along a planar surface of a conductive chassis of the device, the conductive chassis is configured as a passive device electrode; disposing a dielectric insert over an area of the cutout; integrating a conductive plate into the dielectric insert and configuring the conductive plate as an active device electrode; integrating an antenna coupler to the conductive plate; and facilitating a wireless charging using the active device electrode and the passive device electrode and providing a wireless connectivity through the antenna coupler.

In Example 18, the method as recited in Example [0088], wherein the conductive chassis is connected to a system ground.

In Example 19, the method as recited in Example [0088], wherein the conductive chassis is a metallic chassis.

In Example 20, the method as recited in Examples [0088], [0089], [0090], wherein the dielectric insert is made of a plastic material.

In Example 21, the method as recited in Examples [0088], [0089], [0090], wherein the dielectric insert includes a size that is greater than the size of the conductive plate, wherein the conductive plate is concentric with the dielectric insert.

In Example 22, the method as recited in Examples [0088], [0089], [0090], wherein a combined thickness of the dielectric insert and the integrated conductive plate adapts the thickness of the conductive chassis.

In Example 23, a method of implementing a wireless charging and a wireless connectivity in a device, the method comprising: means for forming a cutout along a planar surface of a conductive chassis of the device, the conductive chassis is configured as a passive device electrode; means for disposing a dielectric insert over an area of the cutout; means for integrating a conductive plate into the dielectric insert and configuring the conductive plate as an active device electrode; means for integrating an antenna coupler to the conductive plate; and means for facilitating a wireless charging using the active device electrode and the passive device electrode and providing a wireless connectivity through the antenna coupler.

In Example 24, the method as recited in Example 23, wherein the means for forming the cutout includes the conductive chassis that is connected to a system ground.

In Example 25, the method as recited in Example 23, wherein the means for forming the cutout includes the conductive chassis that is a metallic chassis.

In Example 26, the method as recited in Examples 23, 24, or 25, wherein the means for disposing the dielectric insert includes the dielectric insert that is made of a plastic material.

In Example 27, the method as recited in Examples 23, 24, or 25, wherein the means for disposing the dielectric insert includes a dielectric insert size that is greater than the size of the conductive plate, wherein the conductive plate is concentric with the dielectric insert.

In Example 28, the method as recited in Examples 23, 24, or 25, wherein the means for integrating the conductive plate to the dielectric insert includes a combined thickness of the dielectric insert and the integrated conductive plate that adapts the thickness of the conductive chassis.

In Example 29, the method as recited in Examples 23, 24, or 25, wherein the device is selected from a group that includes a tablet, a mobile phone, and a laptop.

What is claimed is:

1. A device comprising:
   a conductive chassis positioned at a bottom surface of the device, the conductive chassis includes a cutout that forms an opening in the bottom surface, wherein the conductive chassis is configured as a passive device electrode;
   a dielectric insert that is positioned to cover an area of the cutout;
   a conductive plate that is integrated to the dielectric insert, the conductive plate is configured as an active device electrode, wherein the active device electrode and the passive device electrode facilitate a wireless charging of the device, wherein a combined thickness of the dielectric insert and the integrated conductive plate fits within space having a thickness of the conductive chassis, wherein a combined thickness of the dielectric insert and the integrated conductive plate fits within space having a thickness of the conductive chassis.

2. The device as recited in claim 1, wherein the conductive chassis is a metallic chassis.

3. The device as recited in claim 1, wherein the conductive chassis is connected to a system ground.

4. The device as recited in claim 1, wherein the dielectric insert includes a size that is greater than the size of the conductive plate, wherein the conductive plate is concentric with the dielectric insert.

5. The device as recited in claim 1, wherein the dielectric insert is made of a plastic material.

6. The device as recited in claim 1, wherein the device is selected from a group that includes a tablet, a mobile phone, and a laptop.

7. The device as recited in claim 1 further comprising an antenna coupler that is integrated to the conductive plate.

8. A wireless charging unit comprising:
   a conductive chassis configured as a passive device capacitive electrode, the conductive chassis includes a cutout that forms an opening along a planar surface of the conductive chassis;
   a dielectric insert that is positioned to cover an area of the cutout;
   a conductive capacitive plate that is integrated to the dielectric insert, the conductive plate is configured as an active device capacitive electrode, wherein the active device capacitive electrode and the passive device capacitive electrode facilitate transmission or reception of a wireless charging power, wherein a combined thickness of the dielectric insert and the integrated conductive plate fits within space having a thickness of the conductive chassis.

9. The wireless charging unit as recited in claim 8, wherein the conductive chassis is connected to a system ground.

10. The wireless charging unit as recited in claim 8, wherein the conductive chassis is a metallic chassis.

11. The wireless charging unit as recited in claim 8, wherein the dielectric insert includes a size that is greater than the size of the conductive plate, wherein the conductive plate is concentric with the dielectric insert.

12. The wireless charging unit as recited in claim 8, wherein the dielectric insert is made of a plastic material.

13. The wireless charging unit as recited in claim 8, wherein the integrated conductive plate is configured to operate on a low frequency signal and a relatively high operating voltage during a capacitive wireless charging process.

14. The wireless charging unit as recited in claim 8, wherein the wireless charging unit is connected to a tablet, a mobile phone, or a laptop.

15. The wireless charging unit as recited in claim 8, wherein the conductive plate includes an integrated antenna coupler that is utilized to facilitate a wireless connectivity.

16. A method of implementing a capacitive wireless charging and a wireless connectivity in a device, the method comprising:
    forming a cutout along a planar surface of a conductive chassis of the device, the conductive chassis is configured as a passive device capacitive electrode;
    disposing a dielectric insert over an area of the cutout;
    integrating a conductive capacitive plate into the dielectric insert and configuring the conductive capacitive plate as an active device capacitive electrode, wherein a combined thickness of the dielectric insert and the integrated conductive plate fits within space having a thickness of the conductive chassis;
    integrating an antenna coupler to the conductive capacitive plate; and
    facilitating a capacitive wireless charging using the active device capacitive electrode and the passive device capacitive electrode and providing a wireless connectivity through the antenna coupler.

17. The method as recited in claim 16, wherein the conductive chassis is connected to a system ground.

18. The method as recited in claim 16, wherein the conductive chassis is a metallic chassis.

19. The method as recited in claim 16, wherein the dielectric insert is made of a plastic material.

* * * * *